(12) United States Patent
Luo

(10) Patent No.: US 11,752,888 B2
(45) Date of Patent: Sep. 12, 2023

(54) CHARGING CONNECTOR AND ELECTRIC VEHICLE

(71) Applicant: TI-LANE PRECISION ELECTRONIC CO., LTD., Shenzhen (CN)

(72) Inventor: Baojun Luo, Shenzhen (CN)

(73) Assignee: TI-LANE PRECISION ELECTRONIC CO., LTD., Shenzhen (CN)

( * ) Notice: Subject to any disclaimer, the term of this patent is extended or adjusted under 35 U.S.C. 154(b) by 49 days.

(21) Appl. No.: 17/538,255

(22) Filed: Nov. 30, 2021

(65) Prior Publication Data
US 2023/0137771 A1 May 4, 2023

(30) Foreign Application Priority Data
Oct. 28, 2021 (CN) .......................... 202111263357.5

(51) Int. Cl.
*B60L 53/16* (2019.01)
*H01R 13/66* (2006.01)

(52) U.S. Cl.
CPC .......... *B60L 53/16* (2019.02); *H01R 13/6616* (2013.01); *H01R 13/6683* (2013.01); *H01R 2201/26* (2013.01)

(58) Field of Classification Search
CPC ..... B60L 53/16; H01R 13/6616; H01R 13/16; H01R 13/6683
USPC ........................................................ 439/34
See application file for complete search history.

(56) References Cited

U.S. PATENT DOCUMENTS

| 2013/0307480 A1* | 11/2013 | Boggs | B60L 3/0046 320/118 |
| 2013/0314034 A1* | 11/2013 | Ang | H02J 7/1438 320/137 |
| 2014/0091764 A1* | 4/2014 | Kinomura | B60L 53/11 320/109 |

(Continued)

*Primary Examiner* — Alexander Gilman
(74) *Attorney, Agent, or Firm* — Chun-Ming Shih; LANWAY IPR SERVICES

(57) ABSTRACT

The present disclosure provides a novel charging connector and an electric vehicle, relates to the technical field of electric vehicle accessories, and solves the technical problems of poor connection stability due to cable connection resistance between a signal terminal and a grounding terminal in the prior art. The novel charging connector comprises a connector body; a grounding terminal and a signal terminal, wherein the grounding terminal and the signal terminal are provided at intervals along the first direction, and are both provided with plug-in parts; a resistor integrated part, wherein resistor integrated part comprises an integrated part body, the integrated part body is provided in the connector body along the second direction perpendicular to the first direction, the integrated part body is provided with a resistor and two elastic contact parts which are connected with the resistor and extend from the integrated part body to the first direction at intervals, and the two elastic contact parts are elastically abutted against the plug-in part on the grounding terminal and the signal terminal, respectively. The present disclosure is used to provide a novel charging connector which can effectively improve the stability of the connection between the signal terminal and the grounding terminal.

9 Claims, 8 Drawing Sheets

(56) References Cited

U.S. PATENT DOCUMENTS

| | | | |
|---|---|---|---|
| 2015/0111408 A1* | 4/2015 | Sasaki | B60L 53/16 |
| | | | 439/357 |
| 2015/0258905 A1* | 9/2015 | Fukushima | H01R 13/74 |
| | | | 439/34 |
| 2015/0258906 A1* | 9/2015 | Ono | H01R 13/701 |
| | | | 320/109 |
| 2015/0318809 A1* | 11/2015 | Mitsutani | B60L 3/04 |
| | | | 290/40 R |
| 2016/0031336 A1* | 2/2016 | Shimizu | B60L 53/16 |
| | | | 439/620.22 |
| 2016/0039298 A1* | 2/2016 | Herzog | B60L 53/30 |
| | | | 320/109 |
| 2016/0297310 A1* | 10/2016 | Kojima | B60L 53/14 |
| 2016/0344131 A1* | 11/2016 | Kanamori | H01R 13/6272 |
| 2017/0062986 A1* | 3/2017 | Sasaki | B60L 53/18 |
| 2019/0106006 A1* | 4/2019 | Ng | H01R 13/6205 |
| 2021/0107370 A1* | 4/2021 | Ando | B60L 53/65 |
| 2021/0170898 A1* | 6/2021 | Ando | E05B 81/56 |
| 2021/0237605 A1* | 8/2021 | Ando | B60L 53/60 |
| 2021/0245610 A1* | 8/2021 | Ando | B60L 53/11 |
| 2022/0250490 A1* | 8/2022 | Fuehrer | B60L 53/16 |
| 2022/0376525 A1* | 11/2022 | Fuehrer | H02J 7/00714 |
| 2023/0054502 A1* | 2/2023 | Hitchcock | B60L 53/16 |
| 2023/0059653 A1* | 2/2023 | Hitchcock | H01R 13/7175 |

\* cited by examiner

CHARGING CONNECTOR AND ELECTRIC VEHICLE

TECHNICAL FIELD

The present disclosure relates to the technical field of electric vehicle accessories, and in particular, to a novel charging connector and an electric vehicle.

BACKGROUND

According to the control guidance circuit required by the charging connector standard, a resistor should be connected between the charging confirmation signal terminal and the grounding terminal in the vehicle charging base to realize the control function.

At present, as shown in FIG. 1, the resistors between the charging confirmation signal terminal and the grounding terminal in the prior art are connected using the splicing cable method, which has the disadvantages that the assembly process of the wire harness factory is cumbersome, the cable is scratched by improper assembly methods or other hidden factors in the assembly process, the inspection is difficult, and there is a risk that the resistor and the wire harness will be broken because the resistor and the wire harness are not fixed in the assembly process.

In addition, as shown in FIG. 2, the temperature monitoring system of the current-carrying terminal of the charging connector fixes the temperature sensor at the tail of the current-carrying terminal by binding. During the assembly process, the parameters, such as the specific location of binding the current-carrying terminal and the binding mode and the number of adhesive tapes, are difficult to be specifically standardized, and it is difficult for inspectors to make a judgment standard for this process after assembly. After aging at high temperature, the glue on the inner side of the adhesive tape will easily lose its adhesive force after oxidation reaction, and the fastening force of the adhesive tape to the temperature sensor due to elastic deformation caused by stretching in the winding process will also be continuously released and reduced in the process of aging at high temperature, thus leading to the risk that the temperature sensor will become loose and not be firmly fixed after aging at high temperature, thus affecting the reading accuracy of the temperature sensor.

The applicant has found that there are at least the following technical problems in the prior art: in the prior art, the resistors are connected by splicing cables between the charging confirmation signal terminal and the grounding terminal, and the connection stability is poor.

SUMMARY

The purpose of the present disclosure is to provide a novel charging connector and an electric vehicle, in order to solve the technical problems in the prior art that the resistors are connected by splicing cables between the charging confirmation signal terminal and the grounding terminal, and the connection stability is poor. Many technical effects that can be produced by the preferred technical solution among many technical solutions provided by the present disclosure are detailed in the following description.

To achieve the above purpose, the present disclosure provides the following technical solution.

The novel charging connector provided by the present disclosure comprises:
 a connector body;
 a terminal column, wherein the terminal column is provided in the connector body, the terminal column comprises a grounding terminal and a signal terminal, the grounding terminal and the signal terminal are provided at intervals along a first direction, and the grounding terminal and the signal terminal are both provided with plug-in parts;
 a resistor integrated part, wherein the resistor integrated part comprises an integrated part body which is provided in the connector body along the second direction perpendicular to the first direction, the integrated part body is provided with a resistor and two elastic contact parts which are connected with the resistor and extend from the integrated part body to the first direction at intervals, and the two elastic contact parts are elastically abutted against the plug-in part on the grounding terminal and the signal terminal, respectively, to electrically connect the grounding terminal and the signal terminal.

As a further improvement of the present disclosure, the connector body is provided with a positioning boss, and the integrated part body is provided with a positioning hole matched with the positioning boss.

As a further improvement of the present disclosure, the plug-in part has an annular structure, an annular groove is provided on the plug-in part, and the elastic contact part is elastically abutted against the annular groove.

As a further improvement of the present disclosure, the novel charging connector further comprises a current-carrying terminal and a temperature sensor, wherein the current-carrying terminal is provided in the connector body through a second fixing frame, and a conductive part is provided on the current-carrying terminal;
 the temperature sensor is fixed in the connector body through a sensor bracket, a heat-conducting elastic plate is provided on the sensor bracket, the temperature sensor is connected with a first end of the heat-conducting elastic plate, and the conductive part is abutted against a second end of the heat-conducting elastic plate.

As a further improvement of the present disclosure, the first end of the sensor bracket is connected with the second fixing frame, a mounting hole is provided in the sensor bracket, and the temperature sensor is provided in the mounting hole and extends out of the second end of the sensor bracket;
 the heat-conducting elastic plate is buckled with the second end of the sensor bracket, a claw is provided on the first end of the heat-conducting elastic plate, and the claw is clamped on the temperature sensor.

As a further improvement of the present disclosure, an annular boss is provided in the mounting hole, and the temperature sensor is abutted against the annular boss.

As a further improvement of the present disclosure, two groups of current-carrying terminals and temperature sensors are provided, and the two groups of temperature sensors are provided corresponding to the two groups of current-carrying terminals, respectively.

As a further improvement of the present disclosure, the second end of the heat-conducting elastic plate has an arc structure.

As a further improvement of the present disclosure, the second fixing frame is provided with an opening, and the sensor bracket is matched with the opening.

An electric vehicle comprises the novel charging connector as described above.

The present disclosure has the following beneficial effects. According to the novel charging connector and the electric vehicle provided by the present disclosure, a resistor integrated part is provided. The resistor integrated part is provided with a resistor and two elastic contact parts. The grounding terminal and the signal terminal are both provided with plug-in parts. The two elastic contact parts are abutted against the plug-in part to electrically connect the grounding terminal and the signal terminal, so that the connection between the resistor and the signal terminal and the grounding terminal is more stable and reliable, and risks such as scratching, crushing, open circuit and the like of the resistance wire in the assembly process are avoided. Secondly, the resistor integrated part is directly mounted in the connector body, which simplifies the mounting process and is conducive to automatic assembly. In addition, the after-sales cost is reduced. Once the resistance fault or abnormal aging of the resistance wire is found in the traditional pressure welding method, it is necessary to cut out the charging confirmation signal cable and the grounding cable and then re-connect the resistance wire when a new resistor needs to be replaced. If the length of the wire harness is not enough, it may be necessary to replace the whole high-voltage wire harness, resulting in high after-sales cost.

BRIEF DESCRIPTION OF THE DRAWINGS

In order to more clearly explain the embodiments of the present disclosure or the technical solutions in the prior art, the drawings that need to be used in the description of the embodiments or the prior art will be briefly introduced hereinafter. Obviously, the drawings in the following description are only some embodiments of the present disclosure. For those skilled in the art, other drawings can be obtained according to these drawings without paying creative efforts.

In the figures: 1. Connector body; 2. Grounding terminal; 3. Signal terminal; 4. Resistor integrated part; 5. First fixing frame; 6. Current-carrying terminals; 7. Second fixing frame; 8. Temperature sensor; 9. Sensor bracket; 11. Positioning boss; 12. Fixing groove; 21. First plug-in part; 31. Second plug-in part; 41. Integrated part body; 42. Positioning hole; 43. Resistor; 44. Elastic contact part; 61. Conductive part; 91. Mounting hole; 92. Heat-conducting elastic plate; 93. Claw; 94. Annular boss.

DETAILED DESCRIPTION OF THE EMBODIMENTS

Figure 1:
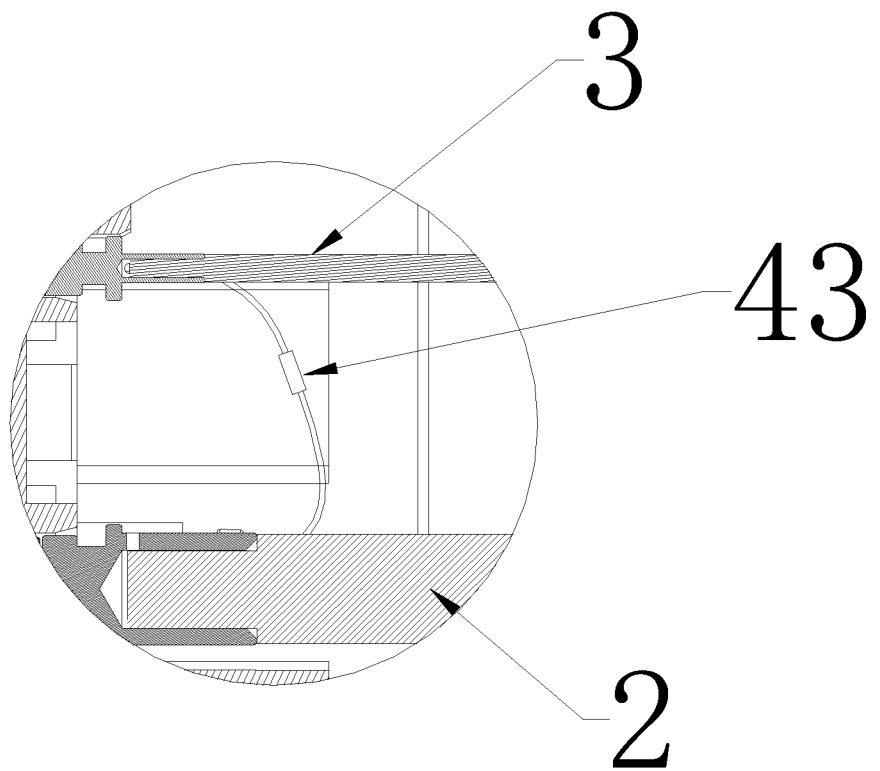
FIG. 1 is a schematic diagram of the connection structure between a grounding terminal and a signal terminal in the prior art.
Figure 2:
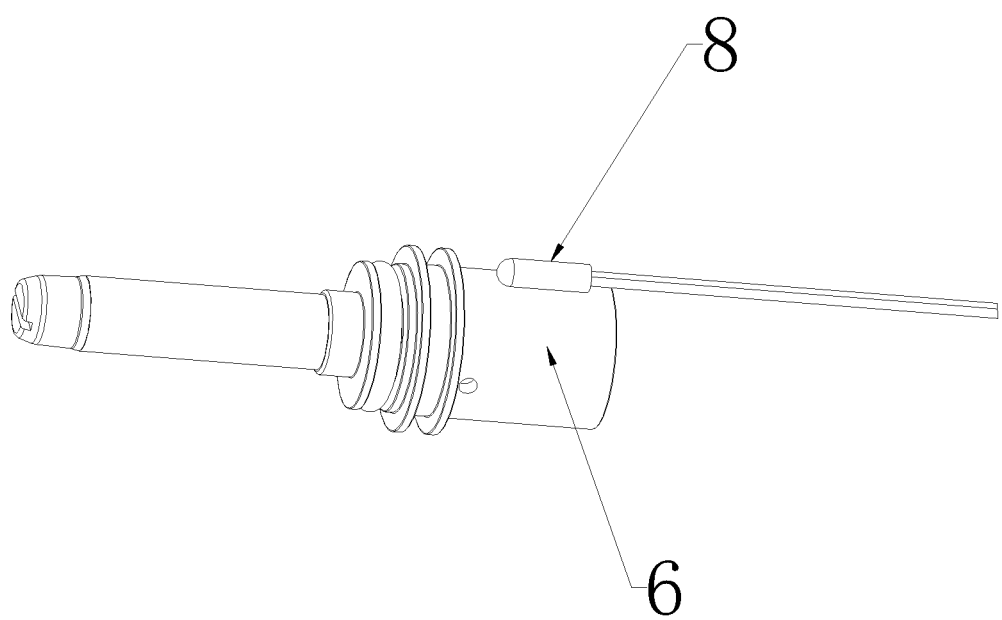
FIG. 2 is a schematic diagram of the connection structure of a temperature sensor in the prior art.
Figure 3:
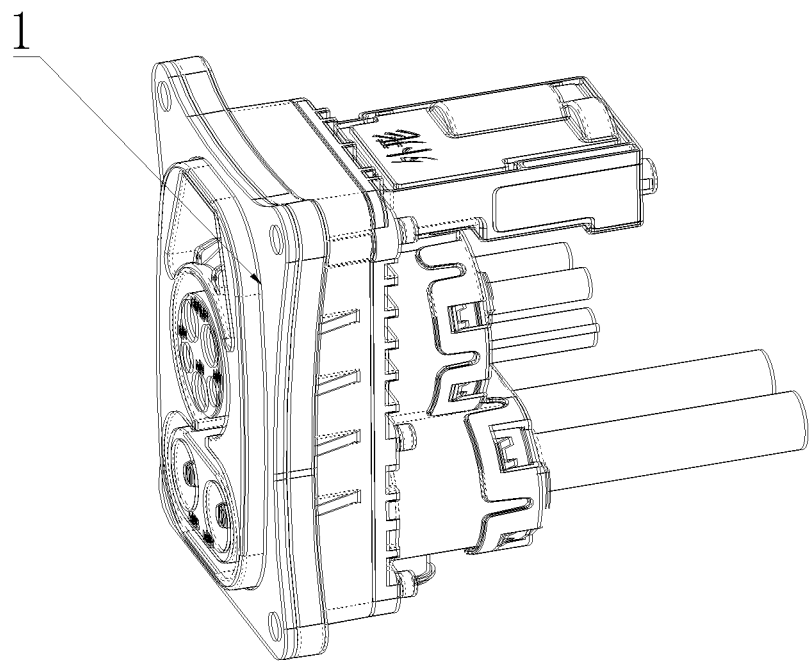
FIG. 3 is a perspective view of the present disclosure.
Figure 4:
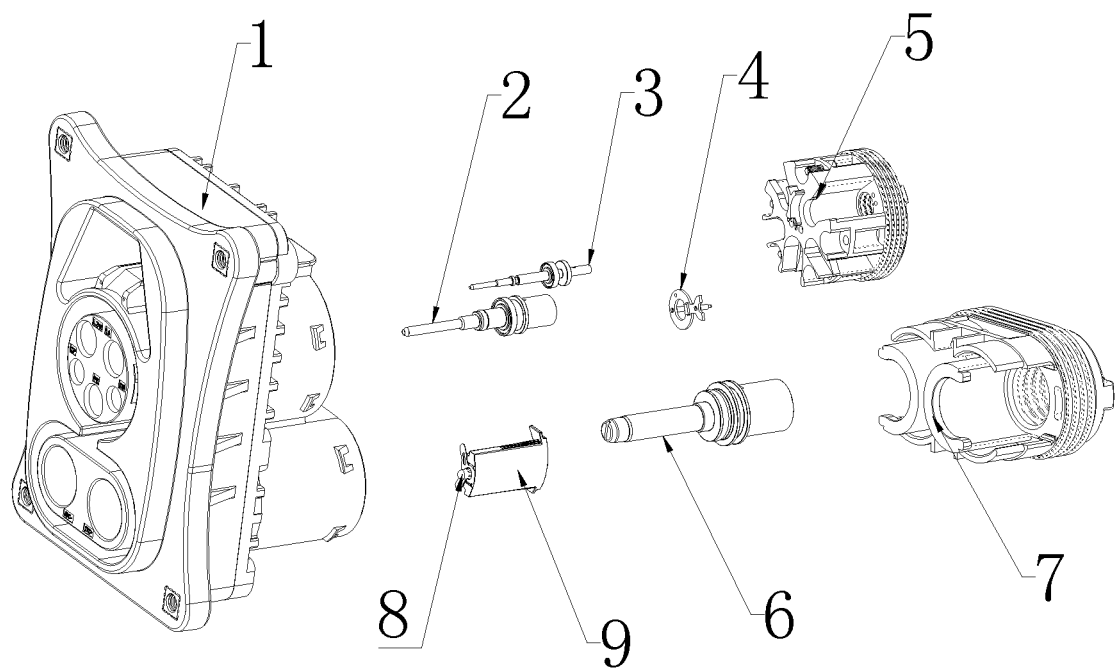
FIG. 4 is an exploded view of the present disclosure.
Figure 5:
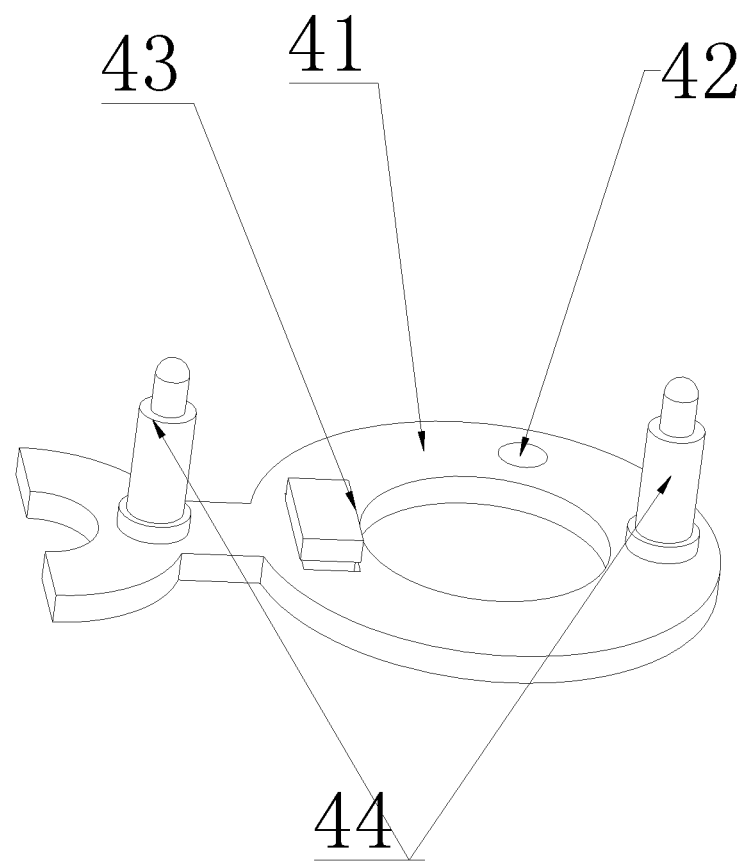
FIG. 5 is a schematic structural diagram of a resistor integrated part according to the present disclosure.
Figure 6:
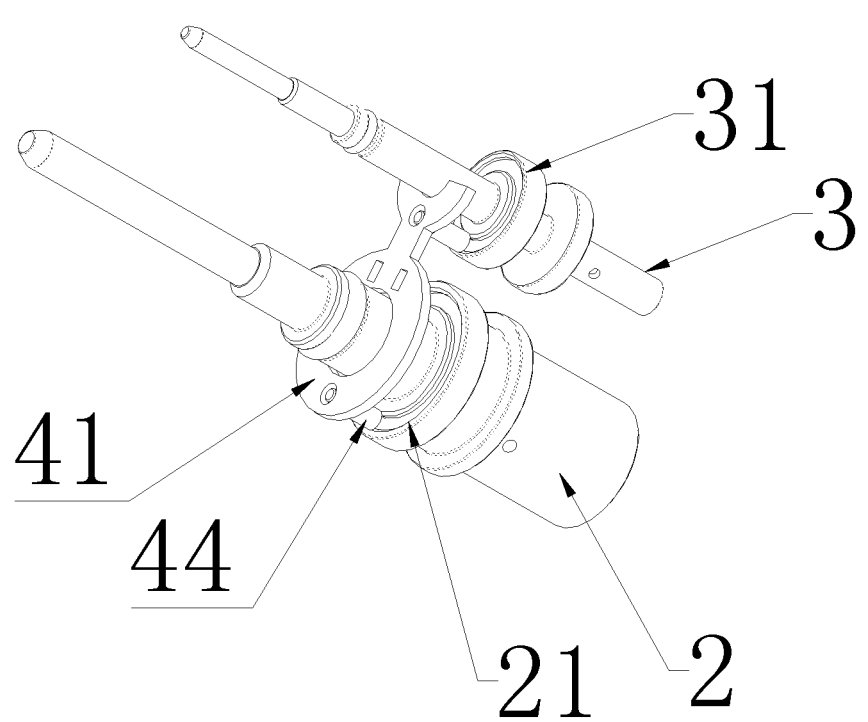
FIG. 6 is a schematic diagram of the connection structure between a grounding terminal and a signal terminal according to the present disclosure.
Figure 7:
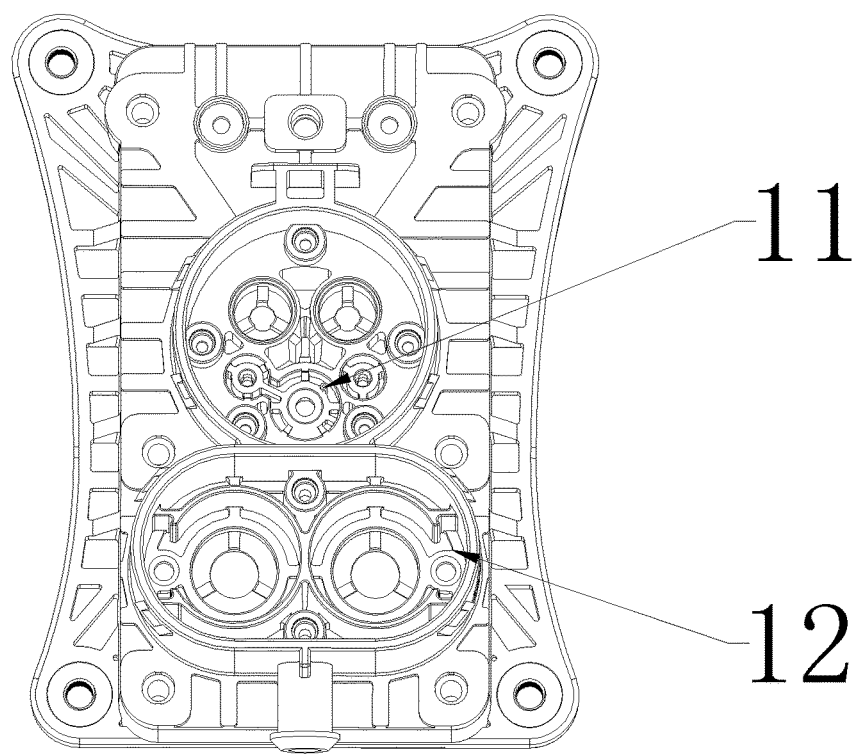
FIG. 7 is a partial structural schematic diagram (1) of a connector body according to the present disclosure.
Figure 8:
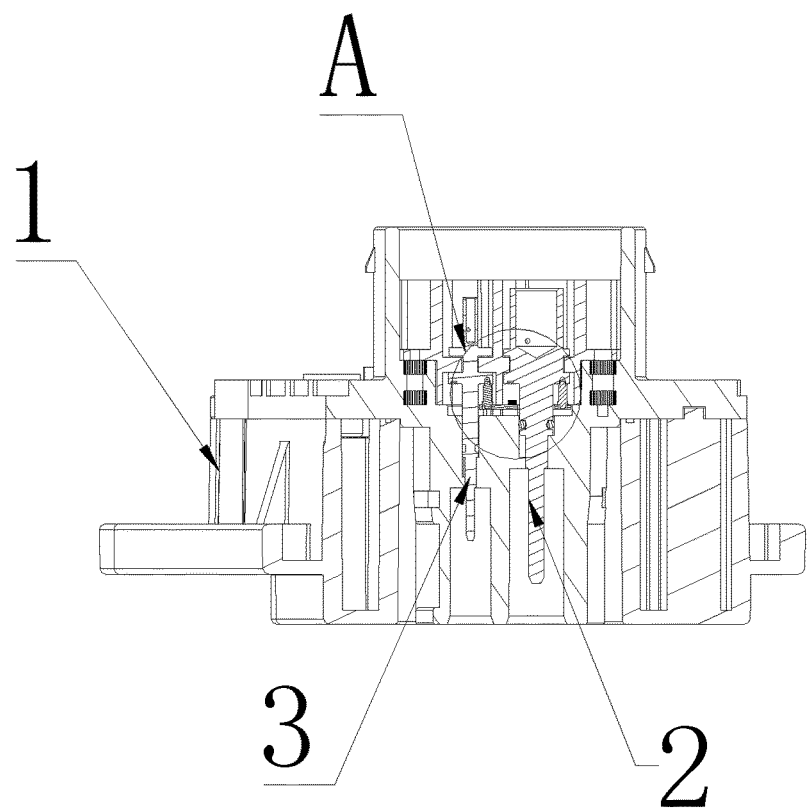
FIG. 8 is a cross-sectional view (1) of the present disclosure.
Figure 9:
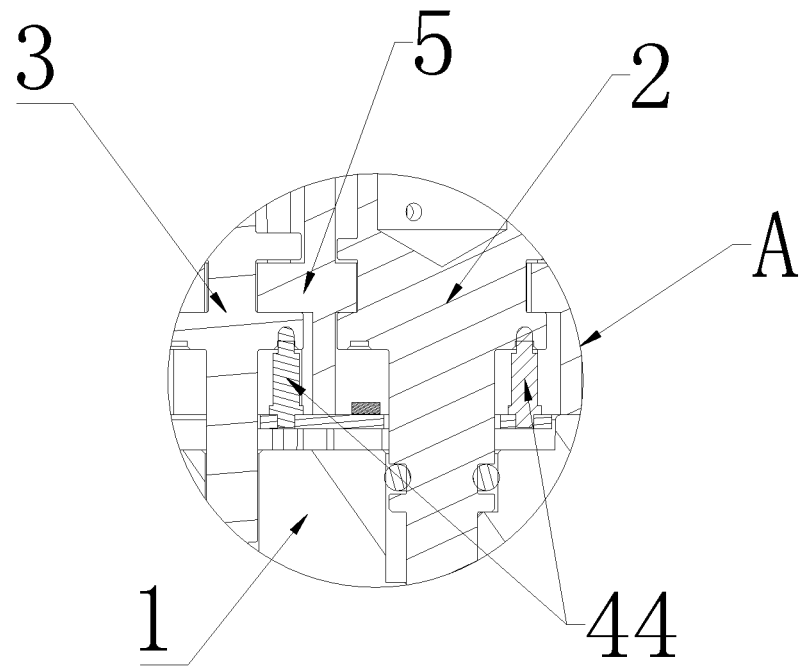
FIG. 9 is a partial schematic diagram (1) of the present disclosure.
Figure 10:
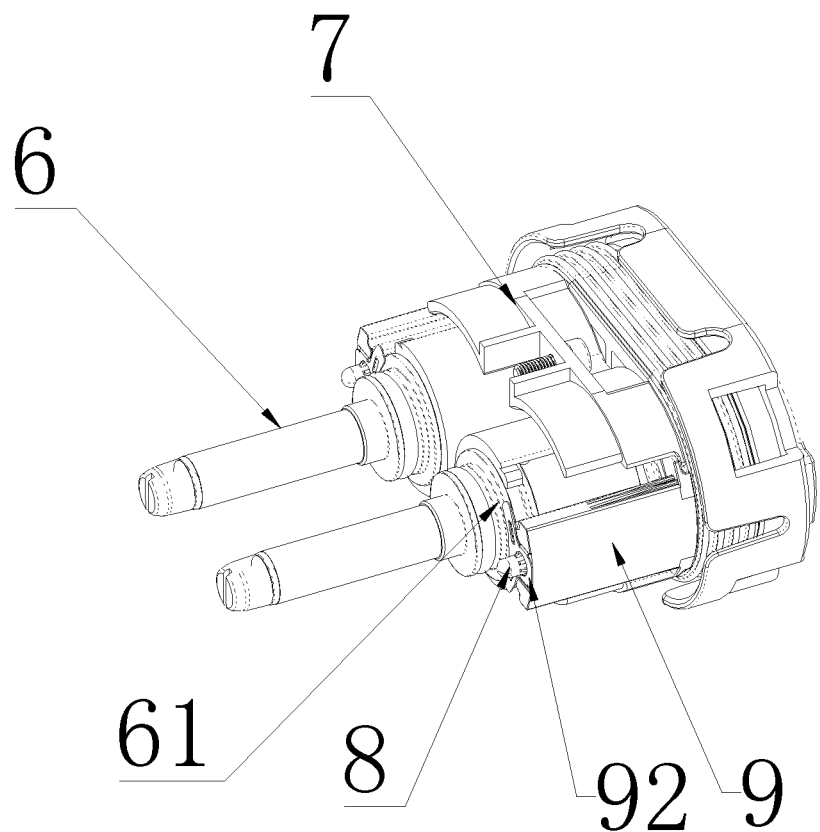
FIG. 10 is a partial structural schematic diagram (2) of a connector body according to the present disclosure.
Figure 11:
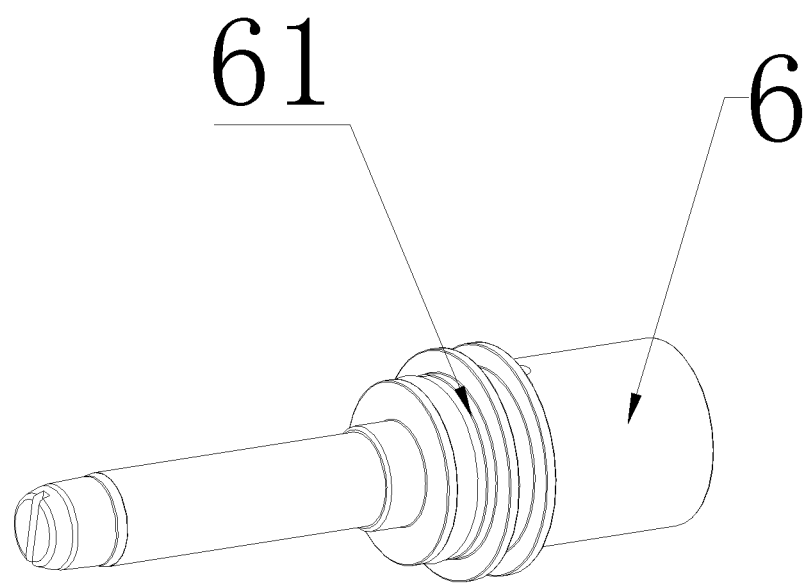
FIG. 11 is a schematic structural diagram of a current-carrying terminal according to the present disclosure.
Figure 12:
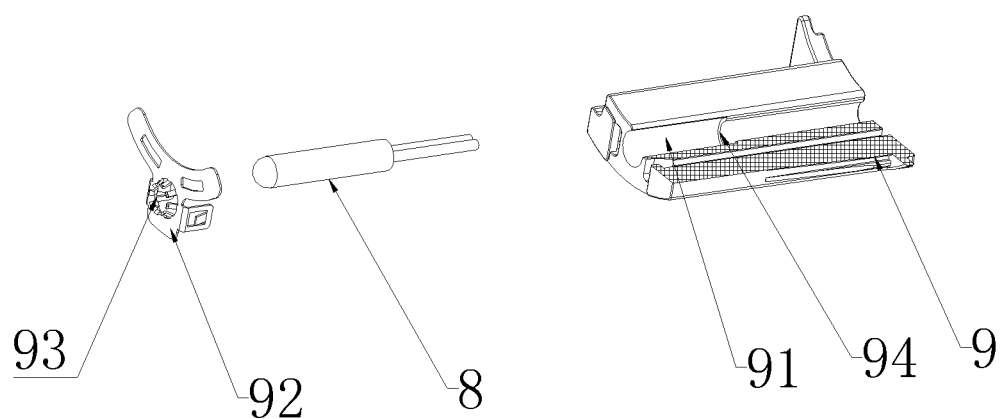
FIG. 12 is a schematic view of a fixing structure of a temperature sensor according to the present disclosure.
Figure 13:
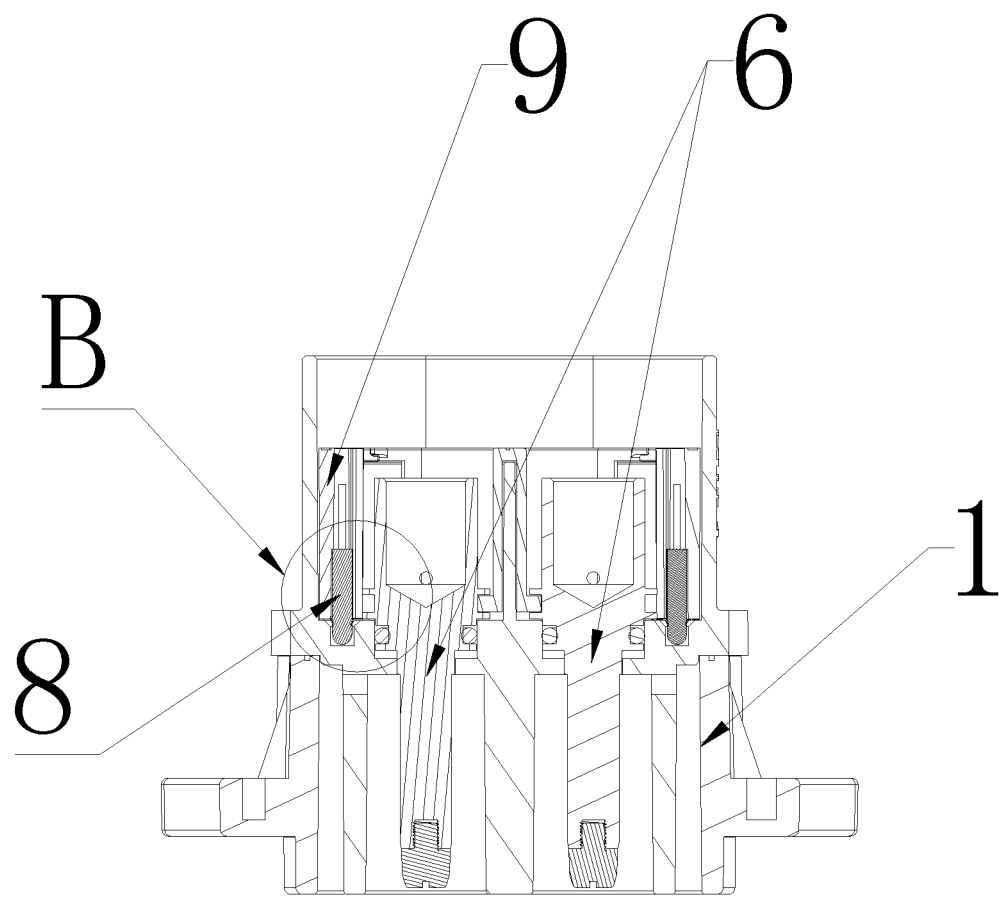
FIG. 13 is a cross-sectional view (2) of the present disclosure.
Figure 14:
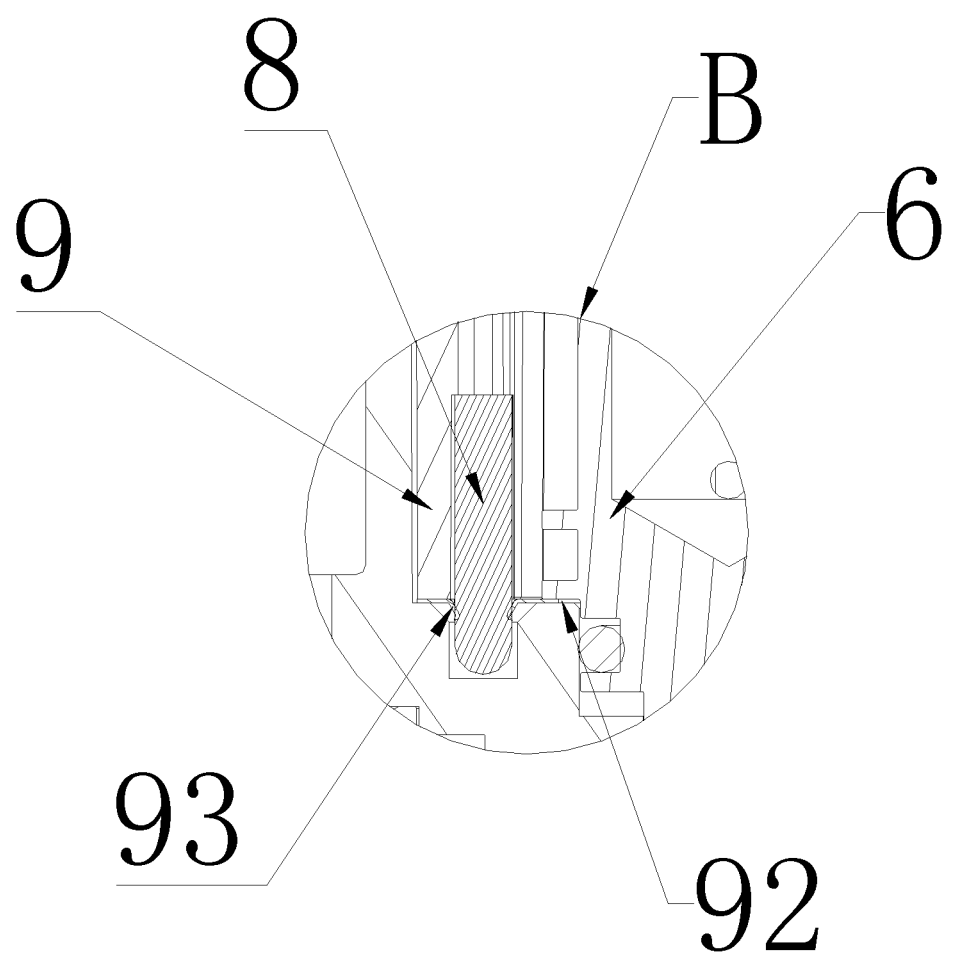
FIG. 14 is a partial schematic diagram (2) of the present disclosure.

The content of the present disclosure and the differences between the present disclosure and the prior art can be understood with reference to FIGS. 1 to 14 of the drawings and the description. The technical solution (including the preferred technical solution) of the present disclosure will be further described in detail by the following figures and by enumerating some alternative embodiments of the present disclosure. It should be noted that any technical features and any technical solutions in this embodiment are one or more of a variety of alternative technical features or alternative technical solutions. For the sake of brevity, this document cannot exhaust all the alternative technical features and alternative technical solutions of the present disclosure, and it is not convenient for the implementation of each technical feature to emphasize that it is one of the alternative embodiments. Therefore, those skilled in the art should know that any technical means provided by the present disclosure can be replaced or any two or more technical means or technical features provided by the present disclosure can be combined with each other to obtain a new technical solution. Any technical features and any technical solutions in this embodiment do not limit the scope of protection of the present disclosure. The scope of protection of the present disclosure should include any alternative technical solution conceivable to those skilled in the art without paying creative efforts, and a new technical solution obtained by combining any two or more technical means or technical features provided by the present disclosure with each other by those skilled in the art.

In the description of the present disclosure, it should be noted that unless otherwise stated, "a plurality of" means two or more. The orientation or positional relationship indicated by the terms such as "up", "down", "left", "right", "inside", "outside", "front", "back", "head" and "tail" are based on the orientation or positional relationship shown in the drawings, only for the convenience of describing the present disclosure and simplifying the description, rather than indicate or imply that the indicated device or element must have a specific orientation, be constructed and operated in a specific orientation, and therefore cannot be understood as a limitation of the present invention. In addition, the terms such as "first", "second", "third" and so on are only used for the purpose of description, and cannot be understood as indicating or implying relative importance.

In the description of the present disclosure, it should be noted that the terms such as "mounting", "connecting" and "linking" should be broadly understood. For example, they can be fixed connection, detachable connection or integral connection; they can be mechanical connection or electric connection; they can be direct connection or indirect connection through an intermediate medium. For those skilled in the art, the specific meanings of the above terms in the present disclosure can be understood according to specific situations.

The present disclosure provides a novel charging connector and an electric vehicle which can effectively improve the stability of the connection between a signal terminal and a grounding terminal.

Next, the technical solution provided by the present disclosure will be described in more detail with reference to FIGS. 1 to 14.

The present disclosure provides a novel charging connector, comprising:
- a connector body;
- a terminal column, wherein the terminal column is provided in the connector body, the terminal column comprises a grounding terminal and a signal terminal, the grounding terminal and the signal terminal are provided at intervals along a first direction, and the grounding terminal and the signal terminal are both provided with plug-in parts;
- a resistor integrated part, wherein the resistor integrated part comprises an integrated part body which is provided in the connector body along the second direction perpendicular to the first direction, the integrated part body is provided with a resistor and two elastic contact parts which are connected with the resistor and extend from the integrated part body to the first direction at intervals, and the two elastic contact parts are elastically abutted against the plug-in part on the grounding terminal and the signal terminal, respectively, to electrically connect the grounding terminal and the signal terminal.

According to the novel charging connector provided by the present disclosure, a resistor integrated part is provided. The resistor integrated part is provided with a resistor and two elastic contact parts. The grounding terminal and the signal terminal are both provided with plug-in parts. The two elastic contact parts are abutted against the plug-in part to electrically connect the grounding terminal and the signal terminal, so that the connection between the resistor and the signal terminal and the grounding terminal is more stable and reliable, and risks such as scratching, crushing, open circuit and the like of the resistance wire in the assembly process are avoided. Secondly, the resistor integrated part is directly mounted in the connector body, which simplifies the mounting process and is conducive to automatic assembly. In addition, the after-sales cost is reduced. Once the resistance fault or abnormal aging of the resistance wire is found in the traditional pressure welding method, it is necessary to cut out the charging confirmation signal cable and the grounding cable and then re-connect the resistance wire when a new resistor needs to be replaced. If the length of the wire harness is not enough, it may be necessary to replace the whole high-voltage wire harness, resulting in high after-sales cost.

As a further improvement of the present disclosure, the connector body is provided with a positioning boss, and the integrated part body is provided with a positioning hole matched with the positioning boss.

Through the matching of the positioning boss and the positioning hole, the positioning of the resistor integrated part is realized, and the connection stability of the resistor integrated part is ensured.

As a further improvement of the present disclosure, the plug-in part has an annular structure, an annular groove is provided on the plug-in part, and the elastic contact part is elastically abutted against the annular groove.

The plug-in part is provided in an annular structure, and the annular groove is provided on the plug-in part, so that the elastic contact part can be mounted more efficiently and quickly, and the mounting efficiency is improved.

As a further improvement of the present disclosure, the novel charging connector further comprises a current-carrying terminal and a temperature sensor, wherein the current-carrying terminal is provided in the connector body through a second fixing frame, and a conductive part is provided on the current-carrying terminal;
- the temperature sensor is fixed in the connector body through a sensor bracket, a heat-conducting elastic plate is provided on the sensor bracket, the temperature sensor is connected with a first end of the heat-conducting elastic plate, and the conductive part is abutted against a second end of the heat-conducting elastic plate.

The novel charging connector provided by the present disclosure further comprises a current-carrying terminal and a temperature sensor, wherein the temperature sensor is fixed in the connector body through the sensor bracket, so that the fixing effect of the temperature sensor is better, and the problems of unreliable connection and inaccurate reading caused by binding the temperature sensor with adhesive tapes in the prior art are avoided. A heat-conducting elastic plate is connected to the sensor bracket, and the heat-conducting elastic plate connects the temperature sensor with the conductive part on the current-carrying terminal, thus realizing the heat conduction between the current-carrying terminal and the temperature sensor and improving the accuracy and reliability of the reading of the temperature sensor. The temperature sensor, the sensor bracket and the heat-conducting elastic plate can realize semi-automatic or automatic production, improve the production efficiency and reduce the labor cost. During assembly, standardization and verifiability can be realized.

As a further improvement of the present disclosure, the first end of the sensor bracket is connected with the second fixing frame, a mounting hole is provided in the sensor bracket, and the temperature sensor is provided in the mounting hole and extends out of the second end of the sensor bracket;
- the heat-conducting elastic plate is buckled with the second end of the sensor bracket, a claw is provided on the first end of the heat-conducting elastic plate, and the claw is clamped on the temperature sensor.

The temperature sensor is fixed in the sensor bracket. One end of the heat-conducting elastic plate is clamped on the temperature sensor through a claw, and the other end of the heat-conducting elastic plate is directly connected with the conductive part on the current-carrying terminal, so that the connection is firm and stable.

As a further improvement of the present disclosure, an annular boss is provided in the mounting hole, and the temperature sensor is abutted against the annular boss.

As a further improvement of the present disclosure, two groups of current-carrying terminals and temperature sensors are provided, and the two groups of temperature sensors are provided corresponding to the two groups of current-carrying terminals, respectively.

As a further improvement of the present disclosure, the second end of the heat-conducting elastic plate has an arc structure. The second end of the heat-conducting elastic plate has an arc structure, which is matched with the current-carrying terminal to improve the stability of the connection between the current-carrying terminal and the heat-conducting elastic plate.

As a further improvement of the present disclosure, the second fixing frame is provided with an opening, and the sensor bracket is matched with the opening.

The second fixing frame is matched with the sensor bracket, and a mounting position is provided in the connector body. After the second fixing frame and the sensor bracket are mounted as a whole, they are directly placed in the mounting position, which improves the mounting efficiency and further improves the reliability of the connection between the second fixing frame and the sensor bracket.

An electric vehicle comprises the novel charging connector as described above.

Embodiment 1

The utility model provides a novel charging connector, comprising:
- a connector body 1;
- a grounding terminal 2 and a signal terminal 3, wherein the grounding terminal 2 and the signal terminal 3 are fixed in the connector body 1 through the first fixing frame 5, the grounding terminal 2 and the signal terminal 3 are provided at intervals along the same direction, the grounding terminal 2 and the signal terminal 3 are both provided with plug-in parts, namely a first plug-in part 21 and a second plug-in part 31, respectively, the first plug-in part 21 and the second plug-in part 31 have an annular structure, and the first plug-in part 21 and the second plug-in part 31 are provided with an annular groove;
- a resistor integrated part 4, wherein the resistor integrated part comprises an integrated part body 41, the integrated part body 41 is provided in the connector body 1, a positioning boss 11 is provided in the connector body 1, a positioning hole 42 matched with the positioning boss 11 is provided on the integrated part body 41, and the integrated part body 41 is positioned in the connector body 1 through the matching of the positioning boss 11 and the positioning hole 42;
- the integrated part body 41 is provided with a resistor 43 and two elastic contact parts 44 which are connected with the resistor 43 and extend from the integrated part body 41 at intervals, and the two elastic contact parts 44 are elastically abutted against the first plug part 21 and the second plug part 31 on the grounding terminal 2 and the signal terminal 3, respectively, to electrically connect the grounding terminal 2 and the signal terminal 3;
- a current-carrying terminal 6, wherein two groups of current-carrying terminals 6 are provided, the two groups of current-carrying terminals 6 are fixed in the connector body 1 through the second fixing frame 7, the two groups of current-carrying terminals 6 are provided with conductive parts 61, and the conductive parts 61 are annular disks;
- a temperature sensor 8, wherein two groups of temperature sensors 8 are provided, and the two groups of temperature sensors 8 are provided corresponding to the two groups of current-carrying terminals 6, respectively;
- each group of temperature sensors 8 are fixed in the connector body 1 through a sensor bracket 9, the first end of the sensor bracket 9 is connected with the second fixing frame 7, and a fixing groove 12 in which the sensor bracket is inserted is provided in the connector body 1.

A mounting hole 91 is provided in the sensor bracket 9. An annular boss 94 is provided in the mounting hole 91. The temperature sensor 8 is mounted in the mounting hole 91. One side of the temperature sensor 8 is abutted against the annular boss 94, and the other side of the temperature sensor 8 extends out of the second end of the sensor bracket 9. A heat-conducting elastic plate 92 is buckled on the second end of the sensor bracket 9. A claw 93 is provided on the first end of the heat-conducting elastic plate 92, and the claw 93 is clamped on the temperature sensor 8. The conductive part 61 is abutted against the second end of the heat-conducting elastic plate 92.

Embodiment 2

An electric vehicle comprises the novel charging connector as described above.

The above is only the specific embodiment of the present disclosure, but the scope of protection of the present disclosure is not limited thereto. Any changes or substitutions conceivable to those skilled in the art within the technical scope disclosed by the present disclosure should be covered within the scope of protection of the present disclosure. Therefore, the scope of protection of the present disclosure should be based on the scope of protection of the claims.

What is claimed is:

1. A novel charging connector, comprising:
   - a connector body;
   - a terminal column, wherein the terminal column is provided in the connector body, the terminal column comprises a grounding terminal and a signal terminal, the grounding terminal and the signal terminal are provided at intervals along a first direction, and the grounding terminal and the signal terminal are both provided with a plug-in part; and
   - a resistor integrated part, wherein the resistor integrated part comprises an integrated part body which is provided in the connector body along the second direction perpendicular to the first direction, the integrated part body is provided with a resistor and two elastic contact parts which are connected with the resistor and extend from the integrated part body to the second direction at intervals, and the two elastic contact parts are elastically abutted against the plug-in part on the grounding terminal and the signal terminal, respectively, to electrically connect the grounding terminal and the signal terminal;
   - wherein the plug-in part has an annular structure, an annular groove is provided on the plug-in part, and the elastic contact part is elastically abutted against the annular groove.

2. The novel charging connector according to claim 1, wherein the connector body is provided with a positioning boss, and the integrated part body is provided with a positioning hole matched with the positioning boss.

3. A novel charging connector, comprising:
   - a connector body;
   - a terminal column, wherein the terminal column is provided in the connector body, the terminal column comprises a grounding terminal and a signal terminal, the grounding terminal and the signal terminal are provided at intervals along a first direction, and the grounding terminal and the signal terminal are both provided with a plug-in part;
   - a resistor integrated part, wherein the resistor integrated part comprises an integrated part body which is provided in the connector body along the second direction perpendicular to the first direction, the integrated part body is provided with a resistor and two elastic contact parts which are connected with the resistor and extend from the integrated part body to the second direction at intervals, and the two elastic contact parts are elastically abutted against the plug-in part on the grounding terminal and the signal terminal, respectively, to electrically connect the grounding terminal and the signal terminal; and a current-carrying terminal and a temperature sensor, wherein the current-carrying terminal is provided in the connector body through a second fixing frame, and a conductive part is provided on the current-carrying terminal;

wherein the temperature sensor is fixed in the connector body through a sensor bracket, a heat-conducting elastic plate is provided on the sensor bracket, the temperature sensor is connected with a first end of the heat-conducting elastic plate, and the conductive part is abutted against a second end of the heat-conducting elastic plate.

4. The novel charging connector according to claim 3, wherein the first end of the sensor bracket is connected with the second fixing frame, a mounting hole is provided in the sensor bracket, and the temperature sensor is provided in the mounting hole and extends out of the second end of the sensor bracket;

the heat-conducting elastic plate is buckled with the second end of the sensor bracket, a claw is provided on the first end of the heat-conducting elastic plate, and the claw is clamped on the temperature sensor.

5. The novel charging connector according to claim 4, wherein an annular boss is provided in the mounting hole, and the temperature sensor is abutted against the annular boss.

6. The novel charging connector according to claim 4, wherein two groups of current-carrying terminals and temperature sensors are provided, and the two groups of temperature sensors are provided corresponding to the two groups of current-carrying terminals, respectively.

7. The novel charging connector according to claim 3, wherein the second end of the heat-conducting elastic plate has an arc structure.

8. The novel charging connector according to claim 3, wherein the second fixing frame is provided with an opening, and the sensor bracket is matched with the opening.

9. An electric vehicle, comprising the novel charging connector according to claim 1.

\* \* \* \* \*